(12) United States Patent
Rouquette et al.

(10) Patent No.: US 8,112,188 B2
(45) Date of Patent: Feb. 7, 2012

(54) DEVICE FOR AIDING THE PILOTING OF AN AIRCRAFT DURING AN APPROACH PHASE FOR THE PURPOSE OF LANDING

(75) Inventors: Patrice Rouquette, Pompertuzat (FR); Jean-Philippe Huynh, Tournefeuille (FR)

(73) Assignee: Airbus Operation SAS, Toulouse (FR)

( * ) Notice: Subject to any disclaimer, the term of this patent is extended or adjusted under 35 U.S.C. 154(b) by 860 days.

(21) Appl. No.: 12/162,731

(22) PCT Filed: Feb. 14, 2007

(86) PCT No.: PCT/FR2007/000258
§ 371 (c)(1),
(2), (4) Date: Jul. 30, 2008

(87) PCT Pub. No.: WO2007/096500
PCT Pub. Date: Aug. 30, 2007

(65) Prior Publication Data
US 2009/0024261 A1 Jan. 22, 2009

(30) Foreign Application Priority Data
Feb. 20, 2006 (FR) ...................................... 06 01453

(51) Int. Cl.
*G08G 5/02* (2006.01)
(52) U.S. Cl. .............. 701/16; 701/4; 340/947; 340/948; 340/951; 342/33

(58) Field of Classification Search .................. 701/3, 4, 701/16, 18; 244/75.1, 76 R, 180, 183, 186; 340/945, 947, 948, 951, 967, 970, 974, 977, 340/979; 342/33, 34, 35
See application file for complete search history.

(56) References Cited

U.S. PATENT DOCUMENTS
3,666,929 A 5/1972 Menn
(Continued)

FOREIGN PATENT DOCUMENTS
EP 1 460 504 9/2004
(Continued)

OTHER PUBLICATIONS
International Search Report dated Jun. 6, 2007 w/ English translation.
(Continued)

*Primary Examiner* — Thomas Black
*Assistant Examiner* — Ce Li
(74) *Attorney, Agent, or Firm* — Dickinson Wright PLLC (57) ABSTRACT

Disclosed is a device for aiding the piloting of an aircraft in an approach phase during landing. The device includes a guidance system for aiding guidance of the aircraft. Controllers can be actuated by the system during an initial phase in accordance with a first guidance mode and during a terminal phase in accordance with a second guidance mode. The transition between the first and second guidance modes can be achieved automatically by the guidance system.

13 Claims, 3 Drawing Sheets

U.S. PATENT DOCUMENTS

| | | | |
|---|---|---|---|
| 3,819,914 A * | 6/1974 | Bettinger et al. | 701/17 |
| 5,716,032 A * | 2/1998 | McIngvale | 244/185 |
| 6,643,580 B1 * | 11/2003 | Naimer et al. | 701/206 |
| 7,038,613 B1 * | 5/2006 | Rouquette et al. | 342/33 |
| 7,084,785 B2 | 8/2006 | Rouquette | |
| 7,237,747 B1 * | 7/2007 | Baudry | 244/76 R |
| 7,256,710 B2 * | 8/2007 | Mumaw et al. | 340/973 |
| 2003/0004619 A1 * | 1/2003 | Carriker et al. | 701/3 |
| 2003/0222794 A1 * | 12/2003 | Vial | 340/961 |
| 2004/0183698 A1 * | 9/2004 | Rouquette et al. | 340/972 |
| 2004/0199304 A1 | 10/2004 | Tatham et al. | |
| 2004/0245408 A1 | 12/2004 | Peyrucain | |
| 2005/0057376 A1 * | 3/2005 | Naimer et al. | 340/973 |
| 2006/0109167 A1 * | 5/2006 | Rouquette et al. | 342/33 |
| 2006/0224281 A1 * | 10/2006 | Foucart et al. | 701/16 |
| 2006/0250280 A1 * | 11/2006 | Chen et al. | 340/974 |
| 2006/0253232 A1 * | 11/2006 | Gerrity et al. | 701/16 |
| 2007/0225876 A1 | 9/2007 | Caillaud | |

FOREIGN PATENT DOCUMENTS

| | | |
|---|---|---|
| FR | 2 852 683 | 9/2004 |
| FR | 2 852 684 | 9/2004 |
| FR | 2 852 686 | 9/2004 |
| FR | 2 852 683 | 5/2005 |
| FR | 2 872 316 | 12/2005 |

OTHER PUBLICATIONS

Written Opinion of the ISA w/ English translation.

* cited by examiner

DEVICE FOR AIDING THE PILOTING OF AN AIRCRAFT DURING AN APPROACH PHASE FOR THE PURPOSE OF LANDING

FIELD OF THE INVENTION

The present invention relates to a device for assisting with flying an aircraft, particularly a transport airplane during an approach phase with a view to landing.

BACKGROUND OF THE INVENTION

Within the context of the present invention, said approach phase exhibits:
- an initial phase defined between a first point (known as the "final approach point") and a second point (known as the "transition point"), during which phase the aircraft is guided according to a predetermined flight plan observing required navigational performance ("Required Navigation Performance" being a universally recognized English-language expression often abbreviated to RNP); and
- a terminal phase defined between this transition point and the actual landing on a runway, during which phase the aircraft is guided along a line of approach.

It is know that, in an international context in which air traffic is ever on the increase, aircraft flight paths are allocated flight lanes of increasingly narrow width. In order to be able to reduce this flight lane width, consideration is given in particular to certain aspects of said aircraft performance. The latter characteristics are in particular implemented during said initial phase of the approach phase between said final approach point and said transition point.

It is also known that the performance aspects that an aircraft needs to be able to observe in order to remain inside such a flight lane are of two types, namely:
- guidance performance: the objective being to make the aircraft correctly follow a flight plan, that is to say to minimize a guidance error (known by its English-language term "Flight Technical Error" or FTE); and
- navigation performance: the objective being to have a good estimate of the actual position of the aircraft, that is to say to minimize a position estimation error ("Position Estimation Error" being a universally acknowledged English-language term often abbreviated to PEE).

In order to meet the above performance criteria it is therefore necessary to minimize the sum of these two errors FTE and PEE, namely a total error known by its English-language term "Total System Error" or TSE.

The ability to adhere to this TSE parameter is one of the requisite conditions that in particular will allow:
- the aircraft to be flown in novel types of approach, over terrain containing obstacles or exhibiting landing restrictions;
- simultaneous approaches to be made to runways that are situated close together; and
- lower minimum landing decision types to be authorized.

As a result, giving consideration to navigation and guidance performance of the RNP type in the aforementioned initial phase (between said final approach point and said transition point) makes it possible to lower the minimum decision heights by comparison with a customary non-precision approach, but does not make it possible to drop below a predetermined altitude, of 250 feet (approximately 75 meters) for example, which relates to said transition point.

From said transition point onward, said terminal phase of the approach phase can be implemented, guiding the aircraft along a line of approach which is consistent with a precision instrument landing approach using, for example, instruments of the ILS (the abbreviation for the recognized English term "Instrument Landing System") or with a non-precision approach.

However, in situations such as these, at the transition (at said transition point) between the initial phase and the terminal phase, the change in guidance mode is generally performed somewhat abruptly, particularly as regards the guidance proper, and in terms of the display of corresponding information presented to the crew. This in particular gives rise to the following disadvantages:
- discomfort to the passengers and the pilot;
- pilot stress as the aircraft reacts sharply; and
- during the initial phase, a lack of information presented to the pilot that will allow him to position the aircraft relative to a line of approach xLS (specified hereinbelow) and check that the position of the aircraft is consistent with this line xLS.

SUMMARY OF THE INVENTION

The present invention relates to a device to assist with flying an aircraft during an approach phase with a view to landing, which will be able to overcome the aforementioned disadvantages, said approach phase exhibiting:
- an initial phase defined between a first transition point and at least one second transition point, during which phase the aircraft is guided according to a predetermined flight plan observing the required navigation performance; and
- a terminal phase defined between this second transition point and the landing, during which phase the aircraft is guided along a line of approach.

To this end, according to the invention, said device of the type comprising:
- a collection of information sources capable of supplying information relating to the aircraft and particularly relating to its current position;
- a navigation database;
- a calculation system capable of determining:
  - a flight path relative to said flight plan;
  - first lateral and vertical deviations between the current position of the aircraft and said flight path;
  - said line of approach; and
  - second lateral and vertical deviations between the current position of the aircraft and said line of approach;
- a guidance system capable of assisting with guiding the aircraft; and
- a display system, is notable in that:
- said device additionally comprises a control system comprising at least one actuatable control means allowing a pilot of the aircraft to instigate (namely set or engage depending on the embodiment) a hybrid approach mode comprising a first guidance mode for guiding the aircraft during said initial phase and a second guidance mode for guiding the aircraft during said terminal phase;
- said calculation system is formed in such a way as to determine, as soon as said control means is actuated, both said first and second deviations relative to said instigated hybrid approach mode and to do so as soon as all the information needed to do so becomes available onboard the aircraft;
- said guidance system is formed in such a way as to assist with guiding the aircraft, if said control means is actuated, both during said initial phase between said first and second transition points in accordance with said first guidance mode, and during said terminal phase from said second transition point onwards, according to said second guidance mode, the transition between said first and second guidance modes being performed automatically by said guidance system; and said display system is formed in such a way as to display, on at least one display screen, as soon as said control means is actuated, at least:
- an indication means indicating said hybrid approach mode instigated;
- an indication means indicating, as appropriate, at least the current guidance mode of said instigated hybrid approach mode; and
- indication means respectively representative of said first and second deviations, this being as soon as these become available.

Thus, by virtue of the invention:
the transition between the first and second guidance modes (that is to say between guidance relating respectively to said initial and terminal phases) is performed automatically by the guidance system; and
the aircraft crew is kept informed, as soon as a hybrid approach mode is instigated (set or engaged) both of this instigation and of deviations relating both to the first and second guidance modes of said instigated hybrid approach mode.

This makes it possible to obtain a simple and effective transition between the initial phase and the terminal phase of said approach phase.

In addition, the aircrew is immediately informed of lateral and vertical deviations, not only in respect of said first guidance mode for the initial phase which is being implemented at this time or which will very soon be implemented, but also in respect of said second guidance mode for said terminal phase which will not be implemented until the end of this initial phase. As a result, the crew can, as soon as the hybrid approach mode is instigated, check the information relating to said second guidance mode and thus anticipate its later application.

The device according to the present invention also displays other advantages. In particular:
- it avoids pilot action close to the ground and therefore reduces the stress and workload of the pilot near to ground level;
- it allows the procedure to harmonized (with the other types of approach) as far as the pilot is concerned in terms of approach selection, monitoring of approach parameters and setting the approach before the final approach point; and
- it allows a gentler approach and a gentler transition (between the RNP and xLS modes specified hereinbelow), and this makes for improved passenger and pilot comfort.

In a preferred embodiment, said control system, for example a multipurpose control display unit ("Multipurpose Control Display Unit" being a universally acknowledged English-language expression commonly abbreviated to MCDU) comprises a plurality of control means, for example push-buttons, each of which can be used to instigate one of a plurality of different hybrid approach modes. In this case, for preference, said control system comprises control means for respectively instigating hybrid approach modes each of which consists of:
- a first guidance mode allowing said required navigation performance (or RNP) to be observed; and
- respectively one of the following second guidance modes: a precision approach mode, from a plurality of different precision approach modes, or a non-precision approach mode.

In the context of the present invention, the device according to the invention is able in particular to give consideration to the following precision approach modes:
- an instrument approach mode relating to an instrument landing system ("Instrument Landing System" being a universally acknowledged English-language expression often abbreviated to ILS);
- an instrument approach mode relating to a microwave landing system ("Microwave Landing System" being a universally acknowledged English-language expression often abbreviated to MLS); and
- an instrument approach mode relating to a GPS landing system ("IGPS" being a universally acknowledged abbreviation for the English-language expression "Global Positioning System") of the GLS type ("GLS" being a universally recognized abbreviation for the English-language expression "GPS Landing System").

In addition, a non-precision approach mode may be of the FLS type as described for example in Patents FR 2 852 683, FR-2 852 684 and FR-2 852 686.

Furthermore, in one particular embodiment, the device according to the invention is formed in such a way as to perform the operations relating to said initial phase also during a go-around phase that interrupts the approach phase in progress. A go-around phase such as this may be needed when a specific fault is detected or when the pilot is unable to get a visual fix on his bearings at the decision height.

Furthermore, advantageously, said display system comprises a navigation display ("Navigation Display" being a universally recognized English-language expression commonly abbreviated to ND) and a primary flight display ("Primary Flight Display" being a universally recognized English-language expression commonly abbreviated to PFD).

In addition, advantageously, said display system is formed in such a way as to differentiate between the displaying of information relating to the current guidance mode of said hybrid approach mode, and the displaying of information relating to the other guidance mode of said hybrid approach mode. This differentiation may, for example, be performed using different colors, different brightnesses and/or different graphics.

Furthermore, advantageously, said display system is formed in such a way as to be able to display:
- first auxiliary indication means relating to information (for example said required navigation performance) regarding said first guidance mode; and
- second auxiliary indication means relating to information (for example the identity of said second guidance mode, a frequency and a channel used by this second guidance mode) regarding said second guidance mode; and possibly
- the position of lateral and vertical transition points.

Furthermore, in one particular embodiment, said calculation system comprises:
- a flight management system ("Flight Management System" being a universally acknowledged English-language expression often abbreviated to FMS) for determining said first lateral and vertical deviations; and
- a landing assistance multimode receiver ("Multimode Receiver" being a universally acknowledged English-language expression often abbreviated to MMR) for determining said lateral and vertical second deviations.

Furthermore, advantageously, said terminal phase begins:
as far as lateral guidance is concerned, when the aircraft reaches a second lateral transition point at the earliest; and
as far as vertical guidance is concerned, when the aircraft reaches a second vertical transition point at the earliest.

In such a case, advantageously:
said navigation database comprises predetermined references of said second lateral and vertical transition points when the second guidance mode corresponds to a precision approach mode; and/or
said calculation system directly calculates the references of said second lateral and vertical transition points when the second guidance mode corresponds to a non-precision approach mode.

BRIEF DESCRIPTION OF THE DRAWINGS

The figures of the attached drawing will make it easy to understand how the invention may be embodied. In these figures, identical references denote elements which are similar.

DETAILED DESCRIPTION OF THE INVENTION

Figure 1:
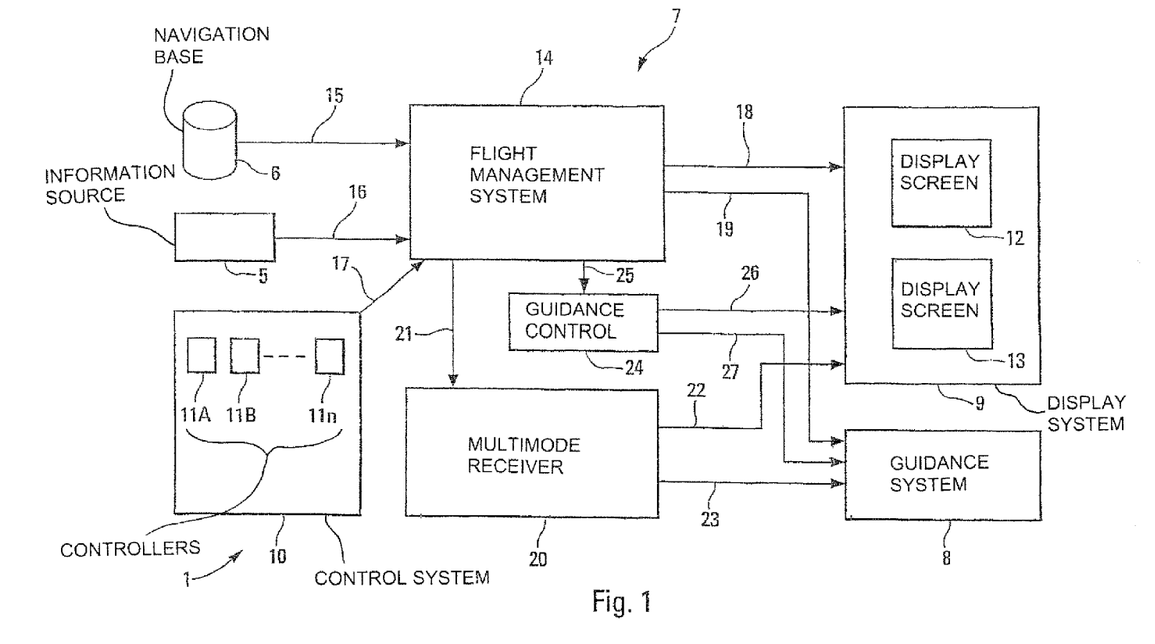
FIG. 1 is the block diagram of a device according to the invention.

The device 1 according to the invention and depicted schematically in FIG. 1 is intended to assist with flying an aircraft A, particularly a transport airplane, during an approach phase PA with a view to landing on a runway 2. To do this, said aircraft A is guided during this approach phase PA along a path T depicted schematically in FIGS. 2 and 3 which relate to one particular example.

Figure 2:
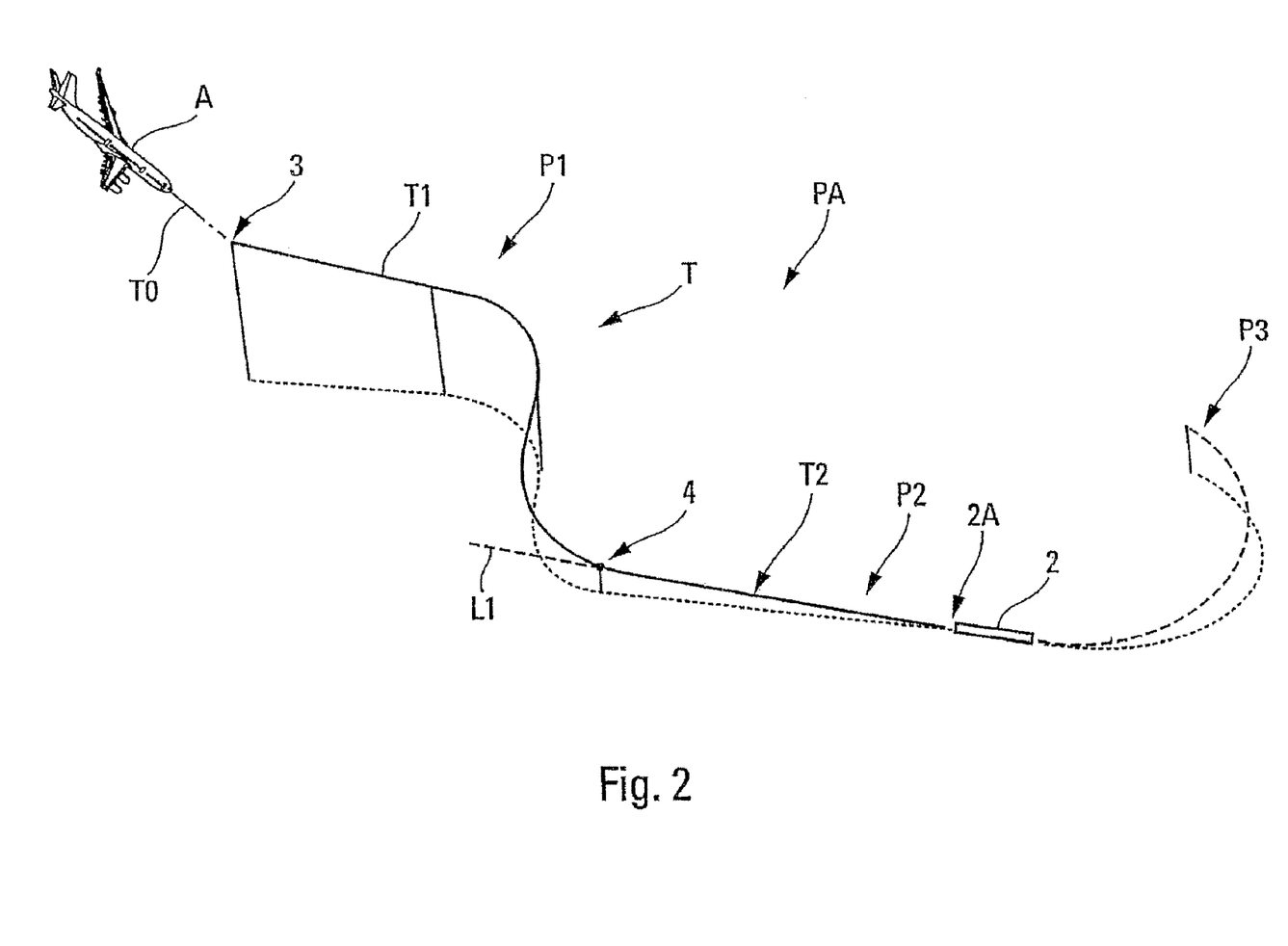
FIGS. 2 and 3 are two graphs schematically illustrating, in the vertical plane and in the horizontal plane, respectively, an approach phase such as the one to which the present invention relates.

In the context of the present invention, said approach phase PA comprises:
an initial phase P1 defined between a transition point 3 (or "final approach point") and at least one other transition point 4, during which phase the aircraft A is guided according to a predetermined flight plan observing required navigation performance ("Required Navigation Performance" being a universally acknowledged English-language expression often abbreviated to RNP); and
a terminal phase P2 defined between the transition point 4 and the landing on the runway 2, during which phase the aircraft A is guided along at least one line of approach L1 depicted schematically in FIG. 2.

Said device 1 is of the type comprising:
a collection 5 of information sources capable of supplying information relating to the aircraft A and particularly relating to its current position. To do this, said collection 5 may in particular comprise inertial reference systems and GPS sensors;
a navigation database 6 specified hereinbelow;
a calculation system 7 capable of determining:
    a flight path T1 relative to said flight plan during said initial phase P1;
    first lateral and vertical deviations between the current position of the aircraft A and said flight path T1 during said initial phase P1;
    said line of approach L1; and
    second lateral and vertical deviations between the current position of the aircraft A and said line of approach L1 during said terminal phase P2;
a guidance system 8 capable of assisting with guiding the aircraft A; and
a display system 9 specified hereinbelow.

Said guidance system 8 comprises the following means which have not been specifically depicted:
a calculation means which is intended in the usual way to determine flight reference data;
at least one flight assistance means, for example an automatic pilot and/or a flight director which, on the basis of the flight reference data received from said calculation means determines the commands for flying the aircraft; and
means of actuating controlled members such as, for example, control surfaces (rudder, ailerons, etc.) of the aircraft, and to which the flight commands thus determined are applied.

According to the invention, said device 1 additionally comprises at least one control system 10, for example a multipurpose control display unit ("Multipurpose Control Display Unit" being a universally acknowledged English-language expression often abbreviated to MCDU) and/or a flight control unit ("Flight Control Unit" being the universally acknowledged English-language expression often abbreviated to FCU) which comprises a plurality of control means 11A, 11B, ..., 11n. Each of said control means 11A, 11B, 11n allows the pilot of the aircraft A to instigate a particular hybrid approach mode which comprises:
a first guidance mode to guide the aircraft A laterally and vertically during said initial phase P1; and
a second guidance mode to guide the aircraft A laterally and vertically during said terminal phase P2.

Figure 3:
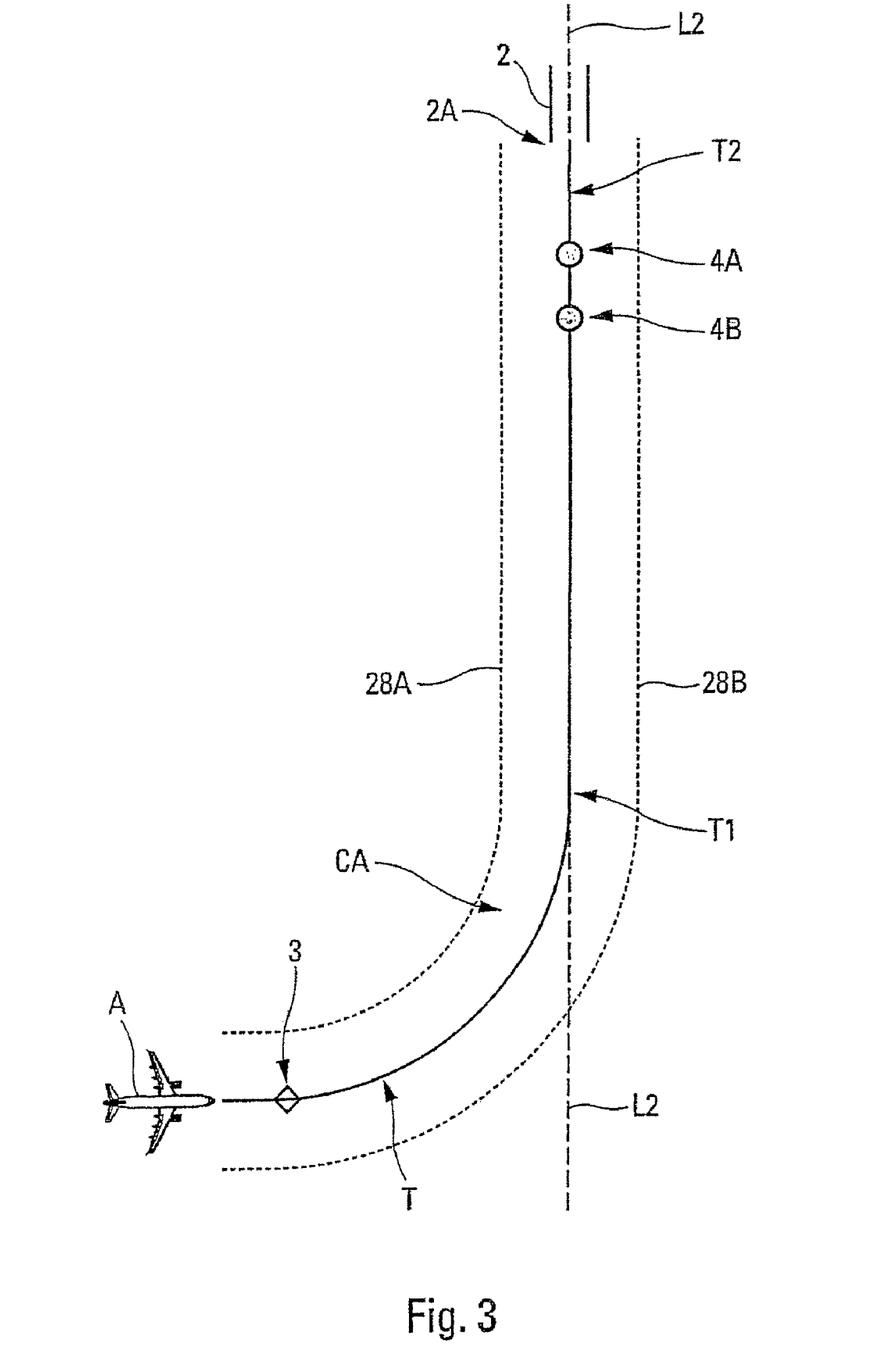

More specifically, said hybrid approach modes consist of:
a first guidance mode in which said required navigation performance (RNP) can be observed in order in particular to keep the aircraft A in a flight lane CA which is delimited by lines 28A and 28B in FIG. 3; and
respectively one of the following second guidance modes:
    a precision approach mode from a plurality of different precision approach modes which use information received from the ground each time;
    a non-precision approach mode which uses only information available on board the aircraft A.

In the context of the present invention, the device 1 according to the invention may in particular give consideration to the following precision approach modes:
an instrument approach mode relating to an instrument landing system ("Instrument Landing System" being a universally acknowledged English-language expression often abbreviated to ILS) as described for example in Patent FR 2 852 685;
an instrument approach mode relating to a microwave landing system ("Microwave Landing System" being a universally acknowledged English-language expression often abbreviated to MLS),
an instrument approach mode relating to a GPS landing system (GPS being the abbreviation for the universally acknowledged English-language expression "Global Positioning System") of the GLS type (GLS being the abbreviation for the universally acknowledged English-language expression "GPS Landing System").

Thus, the various hybrid approach modes can all be denoted in the form "RNP/xLS", xLS in general representing one of the aforementioned approach modes ILS, MLS, GLS and FLS.

Furthermore, according to the invention:

said calculation system 7 is formed in such a way as to determine, as soon as one of said control means 11A, 11B, 11n of said control system 10 is actuated, both said first and second deviations (lateral and vertical) relating respectively to said first and second RNP and xLS guidance modes of said particular RNP/xLS hybrid approach mode thus instigated. Of course, said calculation system 7 determines these first and second deviations only from such time as the information needed to do this becomes available onboard the aircraft A. This is of particular relevance to the line of approach L1 which is used to determine said second deviations and needs to be able to be detected from the aircraft A;

said guidance system 8 is formed in such a way as to assist with guiding the aircraft A, if said control system 10 is actuated, both during said initial phase P1 between said transition points 3 and 4 according to said first guidance mode, and during said terminal phase P2 from said transition point 4 onward, according to said second guidance mode. The transition between said first and second guidance modes is performed automatically by said guidance system 8; and said display system 9 is formed in such a way as to display, on at least one display screen 12, 13, as soon as said control system 10 is actuated, at least the following indication means (produced for example in the form of graphic symbols, alphanumeric captions, etc.) which have not been depicted:

an indication means indicating said instigated hybrid RNP/xLS approach mode;

an indication means indicating, as appropriate, at least the current guidance mode of said instigated hybrid approach mode; and indication means representative respectively of said first and second deviations (both lateral and vertical).

Furthermore, in one particular embodiment, the device 1 according to the invention is formed in such a way as to perform the operations relating to said initial phase P1 in a similar way during a go-around phase P3 (interrupting the approach phase in progress) which is depicted in broken line in FIG. 2. A go-around phase P3 such as this may be needed when a specific fault is detected or when the pilot is unable to gain a visual fix on his bearings at a predetermined decision height.

Furthermore, said display system 9 comprises in particular a navigation display 12 ("Navigation Display" being a universally acknowledged English-language expression commonly abbreviated to ND) and a primary flight display 13 ("Primary Flight Display" being a universally acknowledged English-language expression commonly abbreviated to PFD). In addition, this display system 9 is formed in such a way as to differentiate between the display of information relating to the current guidance mode (for example said first guidance mode) of said hybrid approach mode, and display of information relating to the other guidance mode (for example said second guidance mode) of said hybrid approach mode. This differentiation may, for example, be made using different colors, different brightnesses and/or different graphics.

Furthermore, in one particular embodiment, said display system 9 is formed in such a way as to be able to display:

first auxiliary indicating means relating to information (for example said required navigation performance) regarding said first guidance mode; and second auxiliary indication means relating to information (for example the identity of said second guidance mode, a frequency and a channel used by this second guidance mode) regarding said second guidance mode.

Furthermore, in one particular embodiment, said calculation system 7 comprises:

a flight management system 14 ("Flight Management System" being a universally acknowledged English-language expression commonly abbreviated to FMS) which is intended to determine said first lateral and vertical deviations. This system 14 may be connected by links 15, 16, 17, 18 and 19 to said navigation database 6, to said collection 5 and to said systems 10, 9 and 8, respectively;

a landing assistance multimode receiver 20 ("MultiMode Receiver" being a universally acknowledged English-language expression commonly abbreviated to MMR) which is intended to determine said second lateral and vertical deviations. This receiver 20 can be connected via links 21, 22 and 23 to said systems 14, 9 and 8, respectively; and a guidance control means 24, for example of the FGS type (FGS being the abbreviation for the English-language expression "Flight Guidance System") which is intended to manage the various guidance modes, including the transitions. This means 24 may be connected by links 25, 26 and 27 to said systems 14, 9 and 8 respectively.

In the aforementioned embodiment, said flight management system 14 therefore determines, in the usual way, said first lateral and vertical deviations between the current position of the aircraft A and the flight path T1 that meets the flight plan, particularly using said current position received from said collection 5 and using said flight plan received from said navigation database 6. In addition, said landing assistance multimode receiver 20 determines said second lateral and vertical deviations between the current position of the aircraft A (on the path T2 followed during the terminal phase P2) and the line of approach L1 representative of said second guidance mode using said current position received from said collection 5 via the flight management system 14 and using said line of approach L1 which is, for example, received from said flight management system 14. In the example of FIG. 2, the path T2 actually followed is aligned with the line of approach L1, said second lateral and vertical deviations being very small. In a first embodiment, said single line of approach L1 can be used to guide the aircraft A laterally and vertically making it possible to determine said second lateral and vertical deviations, whereas in a second embodiment said line of approach L1 can be used to guide the aircraft A only vertically making it possible to determine said second vertical deviations. In this second embodiment, the aircraft A can be guided laterally with respect to a second line of approach (for example the line L2 in FIG. 3) making it possible to determine said second lateral deviations.

It will be noted that:

in the context of a precision approach, said line of approach L1 is generally embodied by at least one transmitter located on the ground and is detected onboard the aircraft using at least one customary sensor which, for example, forms part of said receiver 20; and in the context of a non-precision approach, said line of approach L1 is calculated, in the usual way, by said flight management system 14.

It will be noted that, in the context of the present invention, instigation of a particular hybrid approach mode (by actuating a control means 11A, 11B, 11n of the control system 10) will be considered to correspond:

either to direct engagement of said hybrid approach mode;

or to the setting of said hybrid approach mode which will automatically engage when other specific conditions are simultaneously met.

In a first alternative form of embodiment of said device 1, provision may be made for:
- the flight management system 14 to supply the flight plan to the flight guidance system 24;
- the collection 5 to supply the current position of the aircraft A to said flight guidance system 24; and
- said flight guidance system 24 to calculate said first lateral and vertical deviations which it transmits to said systems 8 and 9.

In this first alternative form, the other aforementioned functions are unchanged.

Furthermore, in a second alternative form, provision may be made for the collection 5 of information sources to supply the receiver 20 directly with the current position of the aircraft A.

It will be noted that in a preferred embodiment, said terminal phase P2 begins, as depicted in FIG. 3:
- as far as lateral guidance is concerned, when the aircraft A reaches a lateral transition point 4A at the earliest; and
- as far as vertical guidance is concerned, when the aircraft A reaches a vertical transition point 4B at the earliest.

In situations such as this:
- during a precision approach mode said navigation database 6 contains predetermined references of said lateral and vertical transition points 4A and 4B, and these are used by the second guidance mode corresponding to this precision approach mode; and
- during a non-precision approach, said calculation system 7 directly calculates the references of said lateral and vertical transition points 4A and 4B and these are used by the second guidance mode corresponding to this non-precision approach mode.

Thus, by virtue of the device 1 according to the invention:
- the transition between the first and second guidance modes (that is to say between the guidance relating respectively to said initial and terminal phases P1 and P2) is performed automatically by the guidance system 8. This makes it possible to obtain a simple and effective transition between the initial phase P1 and the terminal phase P2 of said approach phase PA; and
- the crew of the aircraft A is informed, as soon as a hybrid approach mode is instigated (by setting or engagement) both of this instigation and of the deviations relating both to the first and second guidance modes of said instigated hybrid approach mode.

Thus, the crew of the aircraft A is immediately informed of lateral and vertical deviations not only of said first guidance mode for the initial phase P1 which is being implemented at that moment in time (or which will very soon be implemented), but also of said second guidance mode for said terminal phase P2 which will not be implemented until the end of this initial phase P1. As a result, the crew can, as soon as the hybrid approach mode is instigated, check the information relating to said second guidance mode and thus anticipate its later application.

The device 1 according to the invention also displays other advantages. In particular:
- it avoids pilot action close to the ground and therefore reduces the stress and workload of the pilot near to ground level;
- it allows the procedure to be harmonized (with the other types of approach) as far as the pilot is concerned in terms of approach selection, monitoring of approach parameters and setting the approach before the final approach point; and
- it allows a gentler approach and a gentler transition (between the RNP and xLS modes) and this leads to better comfort for the passengers and pilot.

One particular approach made by an aircraft A comprising an approach phase PA of the aforementioned type and a go-around phase P3, that is to say an approach without actually landing, is described hereinbelow. Of course, an approach such as this with a go-around is very rare in practice but it provides a good illustration of the various features of the present invention.

As depicted in FIGS. 2 and 3, the aircraft A is flying toward the transition point 3 (or "final approach point") along a usual path T0, either according to a flight plan (managed mode) managed by the flight management system 14, or following a reference value (selected mode). When the air traffic controller authorizes the crew of the aircraft A to begin their final approach in said approach phase PA, the pilot sets the chosen hybrid approach mode by action on the corresponding actuating means 11A, 11B, 11n of the actuating system 10. In the example concerned, the pilot selects an RNP/ILS approach. Of course, the same scenario remains valid for an RNP/GLS, an RNP/MLS or an RNP/FLS approach.

In response to this selection, the navigation display 12 displays the name of the selected hybrid approach, and the current RNP stipulations to be observed and these are, for example, displayed in the bottom and in the middle of this display 12. A guidance error FTE may also be displayed, for example beside a symbol illustrating the aircraft A. In addition, the device 1 displays the RNP/xLS information (RNP/ILS in the example being considered) on the primary flight display 13, but does not modify the guidance modes currently in use. This selection also leads to the displaying of the ILS line (the line of approach L1) on the navigation display 12.

Thus, through simply actuating a control means 11A, 11B, 11n, the device 1 according to the invention displays a plurality of pieces of information. This information includes, for example, the lateral and vertical deviations from the flight plan and from the line of approach L1, the frequency and the channel for the xLS, the identity of the xLS means, the distance to the runway 2 threshold 2A, a course cross-marker on a heading scale, a lateral RNP scale and possibly a vertical RNP scale.

On arrival at point 3, said first guidance mode of said instigated hybrid approach mode is automatically engaged and the second guidance mode for the terminal phase P2 is automatically set.

The final approach continues until a common lateral/vertical transition point 4 (FIG. 2) or a lateral transition point 4A like the one depicted in FIG. 3 is reached. This lateral transition point 4A is published on a map available to the crew and is coded in a navigation database 6. From this point 4A onward, the xLS precision (at 95%) is better than that required by the RNP (at 95%). It is therefore possible to switch to xLS guidance (second guidance mode). A customary LOC mode relating to this ILS guidance is then engaged and the lateral deviation scale hitherto displayed becomes a pure xLS scale. Information relating to the vertical plane remains unchanged.

Thereafter, when a vertical transition point 4B (also published on the map available to the crew and also coded into the navigation database 6) is reached, a GLIDE mode relating to said second guidance mode (ILS guidance) is engaged and the vertical deviation scale becomes a pure xLS scale.

In the usual way, in this example, the LOC mode is intended to guide the aircraft A laterally along a lateral alignment beam (or LOC beam), for example the beam L2 in FIG. 3 which illustrates the central longitudinal axis of the runway 2, and the GLIDE mode is intended to guide the aircraft A vertically along a vertical guidance beam (or GLIDE beam) for example the beam L1 in FIG. 2.

The two lateral and vertical transition points 4A, 4B (or the aforementioned single lateral/vertical transition point 4) represent points of engagement of the (lateral and vertical) modes of the xLS guidance, at the earliest opportunity. In point of fact, they may be engaged later according to various criteria (distance between aircraft A and threshold 2A, intercept angle, speed, etc.).

If, at a predetermined decision height, the pilot of the aircraft A is unable to obtain a visual fix on the references needed for landing on the runway 2, or if a fault forces him to go around, then the lateral guidance mode of following the flight plan cuts in and the aircraft A implements a phase P3 as depicted in FIG. 2. In addition, deviations from the flight plan managed by said flight management system 14 and the RNP scale (if the go-around procedure is RNP coded) are displayed again. The xLS information remains displayed as long as it is valid (as long as the signal is received from the ground station) because the xLS means remains selected.

The invention claimed is:

1. A device to assist with flying an aircraft during an approach phase with a view to landing, said approach phase exhibiting:
    an initial phase defined between a first transition point and at least one second transition point, during which phase the aircraft is guided according to a predetermined flight plan observing a required navigation performance; and
    a terminal phase defined between this second transition point and the landing, during which phase the aircraft is guided along a line of approach,
    said device comprising:
    a collection of information sources capable of supplying information relating to the aircraft and particularly relating to its current position;
    a navigation database;
    a calculation system capable of determining:
    a flight path relative to said flight plan;
    first lateral and vertical deviations between the current position of the aircraft and said flight path;
    said line of approach; and
    second lateral and vertical deviations between the current position of the aircraft and said line of approach;
    a guidance system capable of assisting with guiding the aircraft; and
    a display system,
    wherein:
    said device additionally comprises a control system comprising at least one actuatable control means allowing a pilot of the aircraft to instigate a hybrid approach mode comprising a first guidance mode for guiding the aircraft during said initial phase and a second guidance mode for guiding the aircraft during said terminal phase;
    said calculation system is formed in such a way as to determine, as soon as said control means is actuated, both said first and second deviations relative to said instigated hybrid approach mode and to do so as soon as all the information needed to do so becomes available onboard the aircraft;
    said guidance system is formed in such a way as to assist with guiding the aircraft, if said control means is actuated, both during said initial phase between said first and second transition points in accordance with said first guidance mode, and during said terminal phase from said second transition point onwards, according to said second guidance mode, the transition between said first and second guidance modes being performed automatically by said guidance system; and
    said display system is formed in such a way as to display, on at least one display screen, as soon as said control means is actuated, at least:
    an indication means indicating said hybrid approach mode instigated;
    an indication means indicating, as appropriate, at least the current guidance mode of said instigated hybrid approach mode; and
    indication means respectively representative of said first and second deviations, this being as soon as these become available.

2. The device as claimed in claim 1,
    wherein said control system comprises a plurality of control means each of which can be used to instigate one of a plurality of different hybrid approach modes.

3. The device as claimed in claim 2,
    wherein said control system comprises control means for respectively instigating hybrid approach modes which consist simultaneously:
    of a first guidance mode allowing said required navigational performance to be observed; and
    of respectively one of the following second guidance modes: a precision approach mode from a plurality of different precision approach modes, or a non-precision approach mode.

4. The device as claimed in claim 1,
    wherein it is formed in such a way as to perform the operations relating to said initial phase also during a go-around phase that interrupts the approach phase in progress.

5. The device as claimed in claim 1,
    wherein said display system comprises a navigation display and a primary flight display.

6. The device as claimed in claim 1,
    wherein said display system is formed in such a way as to differentiate between the displaying of information relating to the current guidance mode of said hybrid approach mode, and the displaying of information relating to the other guidance mode of said hybrid approach mode.

7. The device as claimed in claim 1,
    wherein said display system is formed in such a way as to be able to display:
    first auxiliary indication means relating to information regarding said first guidance mode; and
    second auxiliary indication means relating to information regarding said second guidance mode.

8. The device as claimed in claim 7,
    wherein said display system is formed in such a way as to be able also to display the position of lateral and vertical transition points.

9. The device as claimed in claim 1,
    wherein said calculation system comprises:
    a flight management system for determining said first deviations; and
    a landing assistance multimode receiver for determining said second deviations.

10. The device as claimed in claim 1,
    wherein said terminal phase begins:
    as far as lateral guidance is concerned, when the aircraft reaches the at least one second transition point, wherein the second transition point is defined as a second lateral transition point at the earliest; and as far as vertical guidance is concerned, when the aircraft reaches the at least one second transition point, wherein the second transition point is defined as a second vertical transition point at the earliest.

11. The device as claimed in claim 10,
wherein said navigation database comprises predetermined references of said second lateral and vertical transition points for a second guidance mode corresponding to a precision approach mode.

12. The device as claimed in claim 10,
wherein said calculation system directly calculates the references of said second lateral and vertical transition points for a second guidance mode corresponding to a non-precision approach mode.

13. An aircraft,
wherein it comprises the flight assistance device of claim 1.

* * * * *